(12) United States Patent
Fournier

(10) Patent No.: US 7,669,545 B2
(45) Date of Patent: Mar. 2, 2010

(54) INDICATOR DEVICE WITH A LIGHTED POINTER

(75) Inventor: Joël Fournier, Cergy (FR)

(73) Assignee: Johnson Controls Technology Company, Holland, MI (US)

( * ) Notice: Subject to any disclaimer, the term of this patent is extended or adjusted under 35 U.S.C. 154(b) by 221 days.

(21) Appl. No.: 11/628,606

(22) PCT Filed: May 20, 2005

(86) PCT No.: PCT/FR2005/001263

§ 371 (c)(1),
(2), (4) Date: Oct. 3, 2007

(87) PCT Pub. No.: WO2006/003273

PCT Pub. Date: Jan. 12, 2006

(65) Prior Publication Data

US 2008/0115717 A1   May 22, 2008

(30) Foreign Application Priority Data

Jun. 4, 2004   (FR) ................... 04 06045

(51) Int. Cl.
*G01D 11/28* (2006.01)
*G01D 13/02* (2006.01)

(52) U.S. Cl. .......... 116/288; 116/328; 116/332; 116/334; 116/DIG. 5; 116/DIG. 36; 362/23; 362/29

(58) Field of Classification Search ........... 116/284, 116/286–288, 305, 327, 328, 332, 334, DIG. 5, 116/DIG. 6, DIG. 35, DIG. 36, DIG. 23, 116/46–49, 62.1, 298, 310, 335; 362/23, 362/26–30

See application file for complete search history.

(56) References Cited

U.S. PATENT DOCUMENTS 2,831,453 A * 4/1958 Hardesty .............. 116/288

(Continued)

FOREIGN PATENT DOCUMENTS

DE    29 02 009 A1   7/1980

(Continued)

OTHER PUBLICATIONS

International Search Report for PCT/FR2005/001263, date of mailing Jun. 2, 2006, 3 pages.

*Primary Examiner*—Amy Cohen Johnson
(74) *Attorney, Agent, or Firm*—Foley & Lardner LLP

(57) ABSTRACT

An indicator for a vehicle instrument cluster is provided. The indicator includes a dial configured to guide light from a light source to a pointer which further guides the light so that it is visible by a user.

23 Claims, 2 Drawing Sheets

U.S. PATENT DOCUMENTS

| | | | |
|---|---|---|---|
| 3,131,670 A * | 5/1964 | Hardesty | 116/288 |
| 3,499,417 A * | 3/1970 | Heinke | 116/335 |
| 4,044,708 A | 8/1977 | Klein | |
| 4,258,643 A * | 3/1981 | Ishikawa et al. | 116/286 |
| 4,274,358 A * | 6/1981 | Nakamura et al. | 116/288 |
| 4,872,093 A * | 10/1989 | Shimizu | 362/26 |
| 4,872,415 A * | 10/1989 | Nakadozono et al. | 116/288 |
| 4,935,850 A * | 6/1990 | Smith, Jr. | 362/27 |
| 5,458,082 A * | 10/1995 | Cookingham | 116/288 |
| 5,703,612 A * | 12/1997 | Salmon et al. | 340/815.78 |
| 5,842,435 A * | 12/1998 | Tsukamoto et al. | 116/288 |
| 6,189,480 B1 * | 2/2001 | Staley et al. | 116/288 |
| 6,714,126 B2 * | 3/2004 | Wada | 340/438 |
| 7,159,534 B2 * | 1/2007 | Tanaka et al. | 116/300 |
| 7,347,160 B2 * | 3/2008 | Honma et al. | 116/288 |
| 7,347,575 B2 * | 3/2008 | Fong et al. | 362/23 |
| 7,370,603 B2 * | 5/2008 | Balsfulland et al. | 116/288 |
| 7,434,536 B2 * | 10/2008 | Suess et al. | 116/298 |
| 2002/0108554 A1 | 8/2002 | Zech et al. | |

FOREIGN PATENT DOCUMENTS

| | | |
|---|---|---|
| EP | 0 295 165 B1 | 12/1988 |
| EP | 0 679 871 B1 | 11/1995 |

* cited by examiner

US 7,669,545 B2

INDICATOR DEVICE WITH A LIGHTED POINTER

BACKGROUND

The present application relates to an indicator device with a pointer such as those used in particular on board motor vehicles for displaying vehicle speed or engine revolutions per minute (rpm).

Such an indicator device generally includes a plate supporting a dial in front of which a pointer is mounted to pivot, the pointer having one end secured to a drive shaft and another end that is free (or distal).

Some conventional indicators associate the pointer with a lighting member making it easier to see the position of the pointer relative to the dial, thus improving the legibility of the indicator device.

In certain indicator devices, the lighting member comprises a light-emitting diode (LED) secured to the free end of the pointer. It is difficult to power the LED because the pointer is movable.

To mitigate that drawback, some conventional instrument clusters provide indicator devices in which LEDs are mounted on the plate in the vicinity of the pointer drive shaft to emit a light beam towards an inlet portion arranged in the stationary end (or anchor) of the pointer, the pointer including in the vicinity of its free end an outlet portion for delivering the light beam away from the dial and towards the user. The LEDs are then particularly simple to power. However, the zone of the plate in the vicinity of the drive shaft can be relatively densely occupied, making it difficult to find space for the LEDs.

There also exist indicator devices in which the dial is formed by a ring enabling the center of the dial to be placed in a space suitable for receiving a liquid crystal display (LCD), for example. The pointer is then driven along an inner edge of the dial by an arm that pivots behind the display or by a rack-and-pinion assembly. The above-described solution is difficult to apply to such indicator devices.

Therefore, it is desirable to provide an indicator that has a pointer provided with pointer lighting means that are simple and easy to position within the device.

SUMMARY

In one exemplary embodiment, an indicator device, includes a dial having a pointer movable thereover. The pointer is provided with an inlet portion and an outlet portion for receiving a light beam produced by at least one lighting member. The lighting member is positioned to emit the light beam towards the dial and the dial is arranged to form a member for guiding the light beam towards the inlet portion of the pointer.

In one exemplary embodiment, a vehicle instrument cluster includes any number of indicators having: a housing at least partially covering the indicator; a light source mounted with respect to the housing; a dial coupled to the housing and configured to guide light from the light source to a pointer; and a pointer coupled to the housing and configured to rotate with respect to the housing and further configured to selectively guide light from the dial to illuminate a portion of the instrument cluster.

In one exemplary embodiment, a dial for use in a vehicle instrument cluster includes: a receiving portion configured to accept light therein; and at least one reflective surface included in the receiving portion to guide light received from a first direction and guide the light into a second direction.

In another exemplary embodiment, a method of operating an indicator, configured for use in a vehicle instrument cluster, includes: providing at least one light source configured to provide light in a first direction; providing a dial having a reflective surface, configured to receive light from the first direction and guide light into a second direction; providing a pointer configured to receive light from the second direction and guide the light onto at least one portion of the instrument cluster; and rotating the pointer with respect to the dial to selectively illuminate the at least one portion of the instrument cluster. The portion of the instrument cluster is only illuminable by the light source when the pointer guides light there to.

To this end, the indicator device includes a dial having a pointer movable thereover, the pointer being provided with an inlet portion and an outlet portion for a light beam produced by at least one lighting member. The lighting member is positioned to emit the light beam towards the dial which is arranged to form a member for guiding the light beam towards the inlet portion of the pointer.

There is thus no need to position the lighting member in the immediate vicinity of or facing the pointer, thus simplifying the design of the indicator device and the resulting structure.

In an advantageous embodiment, the dial has an inlet face and an outlet face for the light beam, an opening defined by an inner edge of the dial in which there extends a portion of the pointer, the inner edge of the dial forming the outlet face for the light beam, and the inlet portion for the light beam into the pointer being arranged on the portion of the pointer that is received in the opening and facing the inner edge.

Other characteristics and advantages of the invention appear on reading the following description of a particular and non-limiting embodiment of the present indicator.

BRIEF DESCRIPTION OF THE DRAWINGS

Reference is made to the accompanying drawings.

DESCRIPTION

Figure 1:
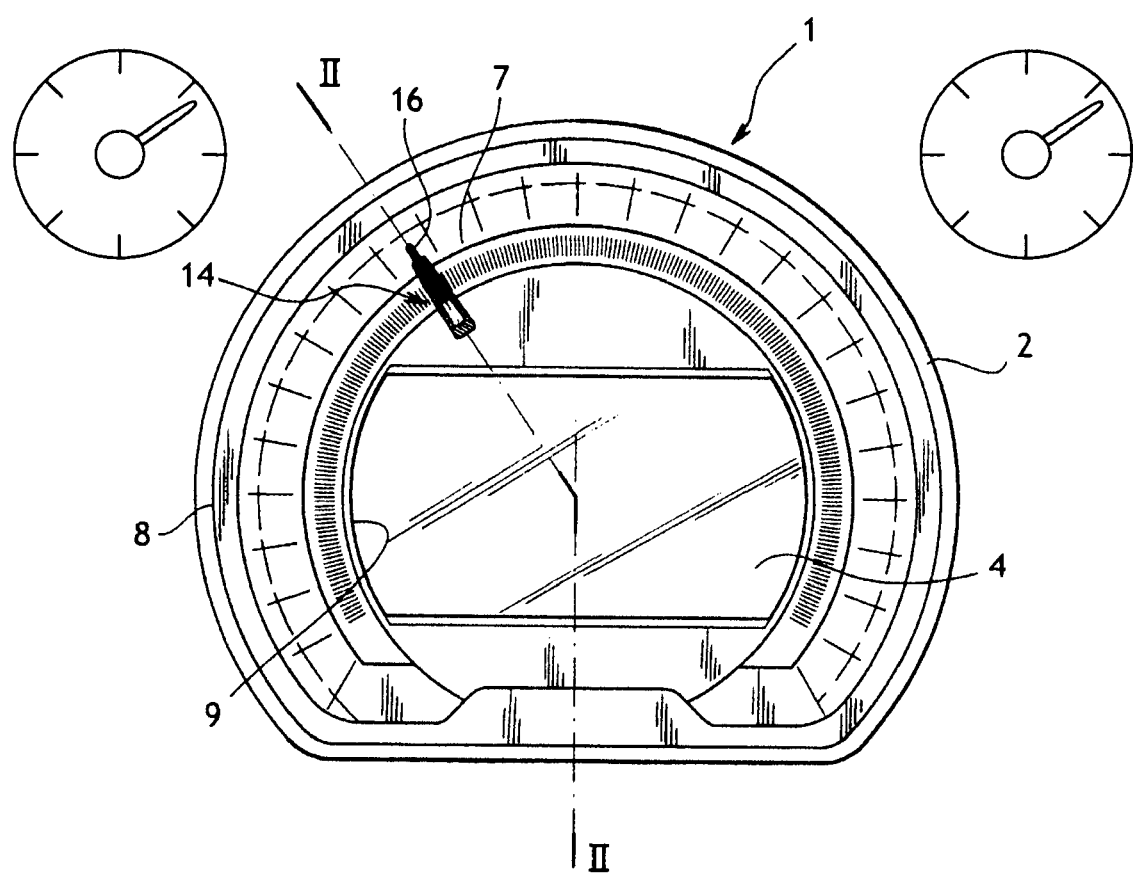
FIG. 1 is a front view of an indicator in accordance with an exemplary embodiment.
Figure 2:
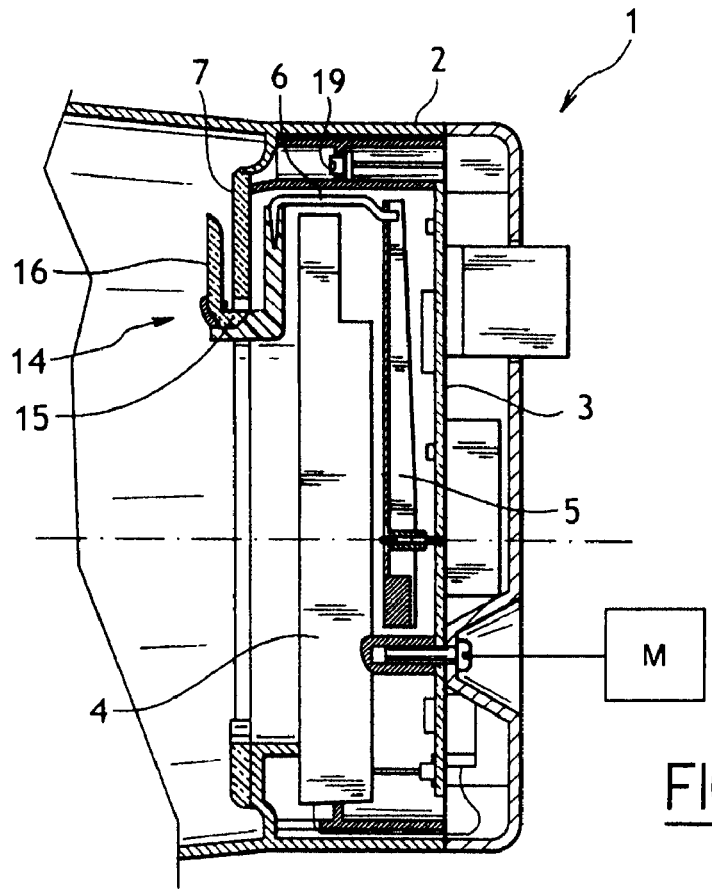
FIG. 2 is a cross-sectional view of the indicator of FIG. 1 sectioned along line II-II of FIG. 1.
Figure 3:
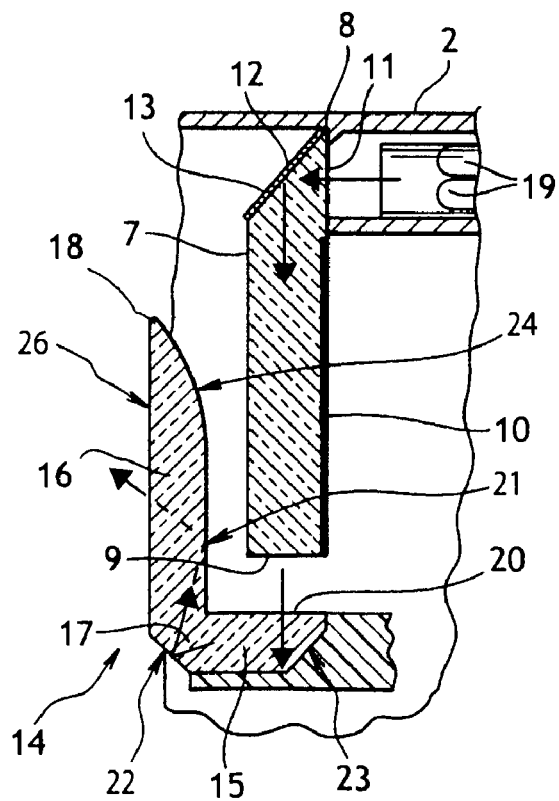
FIG. 3 is a cross-sectional view of a pointer and dial of FIG. 1 sectioned along line II-II of FIG. 1.

With reference to FIGS. 1-3, referring now to FIG. 1, the indicator device 1 includes a housing 2 containing a plate 3 having a liquid crystal display (LCD) 4 mounted thereon and connected to a speed-measuring device (not shown).

An arm 5 is mounted on the plate 3 to pivot between the plate 3 and the display 4, parallel thereto. The arm 5 has one end secured to an outlet shaft of an electric motor M that is secured to a side of the plate 3 opposite from the side where the arm 5 is located and that is connected to an engine revolution measuring device (not shown).

The arm 5 has a terminal portion 6 that is curved to pass around an outer portion of the display 4 (from a first side of the display) and have a free end that extends in front of the display 4 (to a second side of the display) and behind a dial 7 secured to the housing 2 in front of the display 4.

The dial 7 is substantially in the form of a ring having an outer edge 8 and an inner edge 9 that are circular over the major fraction (or portion) of their lengths. The inner edge 9 constitutes an annular surface.

The dial 7 is made of a transparent material, e.g., polymethyl methacrylate (PMMA), and it has a flat bottom with a portion 10 close (or proximate) to the inner edge 9 that carries screen-printed graduations, and a portion 11 close to the outer edge 8 that is blank. The graduations (or hash marks) can be read through the material constituting the dial 7. Opposite from its bottom, the dial 7 has a face 12 that is adjacent to the outer edge 8 and that forms an angle relative to the portion 11. The face 12 is covered by a reflective coating 13 that performs a function that is further explained below. The reflective coating 13 is constituted by paint, for example.

The terminal portion 6 has its free end projecting from the inner edge 9 of the dial 7. A pointer 14 is mounted on the free end to extend in front of the dial 7. More precisely, the pointer 14 is made of a transparent material such as polymethyl methacrylate (PMMA), for example, and includes a finger 15 secured to the free end of the terminal portion 6, and an indicator portion 16 having an end 17 secured to the finger 15 and an opposite end 18 that is free, such that the finger 15 extends in the vicinity of the inner edge 9, and such that the indicator portion 16 is cantilevered out from the finger 15 over the portion 10 of the dial 7.

The indicator device further includes a lighting device having light-emitting diodes (LEDs) 19 associated with a means for guiding light towards the user via the pointer 14.

The LEDs 19 are disposed in the housing 2 in a regular annular distribution behind the dial 7 in register with the portion 11 so as to emit a light beam towards said portion which constitutes the inlet face for the light beam into the dial 7.

The dial 7 has a light beam outlet face that is formed by the annular face constituting the inner edge 9 of the dial 7, and the face 12 constitutes a reflector face for reflecting the light beam coming from the inlet face formed by the portion 11 towards the outlet face formed by the inner edge 9.

The finger 15 has a face 20 parallel to the inner edge 9 of the dial 7 and facing said inner edge 9 so as to constitute the inlet portion for the light beam into the pointer 14. Opposite from the face 20, the finger 15 has a reflector face 23 forming an acute angle with the face 20.

The indicator portion 16 has a surface 21 extending beside the dial 7 (in this case its bottom surface) and a surface 22 extending at a distance from the dial 7 (in this case its top surface) converge towards each other going towards the end 18. The surface 21 in the vicinity of the end 17 has a plane face 21 that is substantially normal to the finger 15 and a convex curved face 24 extending towards the end 18. The surface 22 has an inclined face 22 forming an acute angle with the face 21 and a plane face 26 that is substantially normal to the finger 15 extending towards the end 18 and forming an acute angle with the face 24.

It can be understood that the light beam produced by the LEDs 19 penetrates into the dial 7 via the portion 11 and is reflected by the face 12 towards the inner edge 9 through which it leaves the dial 7 so as to enter into the pointer 14 via the face 20. The dial 7 thus constitutes a member for guiding the light beam towards the pointer 14. The light beam is then reflected in succession by the faces 23, 22, and 24 so as to leave the pointer 14 via the face 26 towards the user or in the direction of the travel plane. Since the face 20 is situated close to the connection end of the pointer and since the face 26 extends to the free end of the pointer, the pointer forms a member for guiding the light beam which is, for example, guided over the full length of the pointer and escapes therefrom in distributed manner along the indicator portion thereof because of the reflection faces 21 and 24.

It can be seen that the portion where the light beam enters the pointer 14 is the face 20 that is perpendicular to the travel plane of the pointer 14 and that the portion where the light beam leaves the pointer is the face 26 that is substantially parallel to the travel plane.

It can also be seen that the pointer 14 is driven by the arm 5 to follow a curved path and that the outlet face for the light beam from the dial 7, i.e. its inner edge 9, extends parallel to the curved part in such a manner that the face 20 is constantly directed towards the inner edge 9 throughout the travel of the pointer along its curved path.

Naturally, the present application is not limited to any embodiments described above, but on the contrary covers any variant.

In particular, the dial can be used for indicating the value of parameters other than engine rpm, for example a speed, a pressure, an altitude, a fuel volume, etc.

The display is optional and the dial could be made in the form of a disk with the pointer being driven directly in pivoting by a shaft, or being in the form of a strip along which the pointer moves. Other configurations are also possible.

The means for driving the pointer can be an electric motor M or other movement generating devices.

The number and arrangement of LEDs can be different. The lighting device could have more than six diodes, some of which could be locally grouped together or could be of different colors so as to mark zones of the dial. The lighting member could also include incandescent sources.

The reflection faces could have their reflection characteristics increased by treatments or depositing reflecting coatings. Nevertheless, this is optional.

The pointer could be of some other shape, having inlet, outlet, and reflection faces that are arranged differently relative to one another.

The material of the dial need not be PMMA, for example it could be some other transparent thermoplastic material or an opaque material.

The dial could have an outer edge defined by an annular surface parallel to its inner edge. The LEDs could then be positioned to emit the beam directly into the outer edge which would then form the inlet face of the dial.

It should be understood that the construction and arrangement of the elements of the instrument cluster in the exemplary embodiments are illustrative only. Although several embodiments of the cluster have been described in detail in this disclosure, many modifications are possible without materially departing from the novel teachings and advantages of the subject matter recited in the claims. Accordingly, all such modifications are intended to be included within the scope of the present vehicle as defined in the appended claims. Unless specifically otherwise noted, the claims reciting a single particular element also encompass a plurality of such particular elements. Moreover, claims reciting that one element is coupled to another should be interpreted to mean that the elements are selectively coupled to each other and may be uncoupled or disconnected at any point. Other substitutions, modifications, changes and/or omissions may be made in the design, operating conditions and arrangement of the preferred and other exemplary embodiments without departing from the spirit of the present invention as expressed in the appended claims.

What is claimed is:

1. An indicator device, comprising:
   a dial having a pointer movable thereover, the pointer being provided with an inlet portion for receiving a light beam produced by at least one lighting member and an outlet portion, wherein the lighting member is positioned to emit the light beam towards the dial;

wherein the dial is arranged to form a member for guiding the light beam towards the inlet portion of the pointer;

wherein the dial has an aperture defined by an inner edge of the dial;

wherein the inlet portion of the pointer extends towards the aperture;

wherein the inner edge of the dial forms the outlet face for the light beam; and wherein the inlet portion of the pointer extending towards the aperture receives the light beam there through and faces the inner edge.

2. The indicator device of claim 1, wherein an inlet face of the dial is mounted perpendicular to the light beam, and the dial includes at least one reflector face for reflecting the light beam received from the inlet face towards the outlet face.

3. The indicator device of claim 2, wherein the at least one reflector face is covered in a reflective coating extending over a corresponding portion of the dial.

4. The indicator device of claim 2, wherein the inlet portion of the pointer is perpendicular to a travel plane defined by the pointer, and wherein the outlet portion of the pointer is substantially parallel to the travel plane.

5. The indicator device of claim 4, wherein the pointer is mounted to follow a curved path and the outlet face of the dial extends parallel to the curved path in such a manner that the inlet portion of the pointer constantly faces towards the outlet face of the dial while traveling along the curved path.

6. The indicator device of claim 5, wherein the inlet face and the reflector face of the dial are adjacent to an outer edge of the dial.

7. A vehicle instrument cluster including any number of indicators, comprising:
a housing at least partially covering the indicator;
a light source mounted with respect to the housing;
a ring-shaped dial coupled to the housing, configured to guide light from the light source to a pointer, wherein an inner edge of the dial, which defines an aperture, provides an outlet face for the light guided to the pointer, wherein the aperture is configured to receive the pointer such that light from the outlet face can enter a portion of the pointer in the aperture; and
wherein the pointer is coupled to the housing and configured to rotate with respect to the housing and further configured to selectively guide light from the dial to illuminate a portion of the instrument cluster.

8. The instrument cluster of claim 7, further comprising:
a display coupled to the housing;
an arm coupled to the pointer; and
an electric motor coupled to the housing on a first side of the display and configured to rotate the arm with respect to the housing;
wherein the pointer is configured to rotate on a second side of the display.

9. The instrument cluster of claim 8, wherein the display is a liquid crystal display.

10. The instrument cluster of claim 7, wherein the display shows hash marks, the dial configured to enable the hash marks to show there through.

11. The instrument cluster of claim 7, wherein the pointer includes at least one reflective surface to guide light there through.

12. The instrument cluster of claim 11, wherein the dial further includes at least one reflective surface to guide light there through.

13. The instrument cluster of claim 7, wherein the pointer includes an indicator portion, configured to receive light from at least one reflective surface and guide light there through.

14. The instrument cluster of claim 7, wherein the pointer includes an arm extending from an axis of rotation of the pointer, and a light guide extending from the arm, and wherein the arm is hidden from view and the light guide receives light from the dial.

15. The instrument cluster of claim 7, wherein the pointer is transparent.

16. The instrument cluster of claim 7, wherein the light source is a light emitting diode.

17. The instrument cluster of claim 7, further comprising:
at least two light sources included in the housing, configured to selectively provide light to the pointer through the dial.

18. The instrument cluster of claim 7, wherein the dial further includes at least one reflective surface to guide light there through.

19. The instrument cluster of claim 7, wherein the dial has a semi-annular configuration and defines an inner portion and an outer portion, wherein the pointer rotates along the inner portion of the dial.

20. The instrument cluster of claim 7, wherein the dial is made of a transparent material.

21. A ring-shaped dial for use in a vehicle instrument cluster, comprising:
a receiving portion configured to accept light therein;
at least one reflective surface included in the receiving portion to guide light received from a first direction and guide the light into a second direction; and
an inner edge of the dial, which defines an aperture and provides an outlet face for the light guided in the second direction;
wherein the aperture is configured to receive a pointer such that light from the outlet face can enter a portion of the pointer in the aperture.

22. The dial of claim 21, wherein the dial is made of a transparent material.

23. A method of operating an indicator, configured for use in a vehicle instrument cluster, comprising:
providing at least one light source configured to provide light in a first direction;
providing a ring-shaped dial having
a reflective surface, configured to receive light from the first direction and guide light into a second direction, and
an inner edge of the dial, which defines an aperture and provides an outlet face for the light guided in the second direction;
providing a pointer, configured to receive light from the second direction and guide the light onto at least one portion of the instrument cluster, wherein the aperture is configured to receive the pointer such that light from the outlet face can enter a portion of the pointer in the aperture; and
rotating the pointer with respect to the dial to selectively illuminate the at least one portion of the instrument cluster, wherein the at least one portion of the instrument cluster is only illuminable by the light source when the pointer guides light there to.

\* \* \* \* \*